(12) United States Patent
Park et al.

(10) Patent No.: US 12,552,907 B2
(45) Date of Patent: Feb. 17, 2026

(54) POLYIMIDE-BASED FILM HAVING EXCELLENT FILLER DISPERSIBILITY AND DISPLAY DEVICE COMPRISING SAME

(71) Applicant: KOLON INDUSTRIES, INC., Seoul (KR)

(72) Inventors: Hyo Jun Park, Seoul (KR); Hak-Gee Jung, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 423 days.

(21) Appl. No.: 18/002,318

(22) PCT Filed: Jul. 9, 2021

(86) PCT No.: PCT/KR2021/008763
§ 371 (c)(1),
(2) Date: Dec. 19, 2022

(87) PCT Pub. No.: WO2022/010298
PCT Pub. Date: Jan. 13, 2022

(65) Prior Publication Data
US 2023/0257532 A1    Aug. 17, 2023

(30) Foreign Application Priority Data

Jul. 10, 2020 (KR) .................. 10-2020-0085591
Jul. 9, 2021 (KR) .................. 10-2021-0090033

(51) Int. Cl.
*C08J 5/18* (2006.01)
*C08K 3/36* (2006.01)
*C08K 9/04* (2006.01)
*G09F 9/30* (2006.01)

(52) U.S. Cl.
CPC ........ *C08J 5/18* (2013.01); *C08K 3/36* (2013.01); *C08K 9/04* (2013.01); *G09F 9/30* (2013.01); *C08J 2379/08* (2013.01)

(58) Field of Classification Search
None
See application file for complete search history.

(56) References Cited

U.S. PATENT DOCUMENTS

2017/0306093 A1* 10/2017 Matsumaru ................ C08J 5/18
2019/0375894 A1* 12/2019 Sakayori .................. C08J 7/046

FOREIGN PATENT DOCUMENTS

| CN | 107810222 A | 3/2018 |
|---|---|---|
| CN | 111161634 A | 5/2020 |
| JP | H02-110138 A | 4/1990 |
| JP | 2006-327022 A | 12/2006 |
| JP | 6530125 B1 | 6/2019 |
| JP | 2019-194327 A | 11/2019 |
| JP | 2019194668 A | 11/2019 |
| JP | 2022-545961 A | 11/2022 |
| KR | 20060126745 A | 12/2006 |
| KR | 20160047499 A | 5/2016 |
| KR | 20160090153 A | 7/2016 |
| KR | 20170113288 A | 10/2017 |
| KR | 20200038186 A | 4/2020 |

OTHER PUBLICATIONS

The office action dated Jul. 27, 2023 related to the corresponding Chinese Patent application.
The office action dated Dec. 11, 2023 related to the corresponding Japanese Patent application.
The office action dated Nov. 2, 2023 related to the corresponding Korean Patent application.

* cited by examiner

*Primary Examiner* — Robert S Jones, Jr.
*Assistant Examiner* — Lily K Sloan
(74) *Attorney, Agent, or Firm* — Harvest IP Law, LLP

(57) ABSTRACT

The present invention provides: a polyimide-based film, which comprises a polyimide-based matrix and a filler dispersed in the polyimide-based matrix and has a density ratio (DR) of the true density relative to the density in a density gradient column, of 1.10 or less; and a display device comprising the polyimide-based film.

11 Claims, 3 Drawing Sheets

POLYIMIDE-BASED FILM HAVING EXCELLENT FILLER DISPERSIBILITY AND DISPLAY DEVICE COMPRISING SAME

CROSS REFERENCE TO RELATED APPLICATION(S)

This application is a National Stage of International Application No. PCT/KR2021/008763 filed Jul. 9, 2021, claiming priority based on Korean Patent Application No. 10-2020-0085591 filed Jul. 10, 2020 and Korean Patent Application No. 10-2021-0090033 filed Jul. 9, 2021, the disclosures of which are incorporated herein by reference in their entireties.

TECHNICAL FIELD

The present disclosure relates to a polyimide-based film having excellent filler dispersibility and to a display device including the same.

BACKGROUND ART

Polyimide (PI) resins are used as automobile materials, aviation materials, spacecraft materials, insulating coatings, insulating films, protective films, and the like owing to excellent insolubility, chemical resistance, heat resistance, radiation resistance, low-temperature characteristics and the like.

Recently, the use of a polyimide-based film instead of glass as a cover window of a display device has been considered with the goal of reducing the thickness and weight and increasing the flexibility of the display device. In order for the polyimide-based film to be used as the cover window of the display device, the polyimide-based film needs to have excellent physical properties, such as hardness, abrasion resistance, and flexibility, and optical properties, such as visibility and light transmittance. In order to impart desired properties to the polyimide-based film, a filler may be added to the polyimide-based film.

DISCLOSURE

Technical Problem

Therefore, the present disclosure has been made in view of the above problems, and it is one object of the present disclosure to provide a polyimide-based film including a filler homogeneously dispersed in a polyimide-based resin.

It is another object of the present disclosure to provide a polyimide-based film having a density ratio (DR, defined as a ratio of a true density to a density-gradient tube density) of 1.10 or less.

It is another object of the present disclosure to provide a polyimide-based film having a particle volume concentration (PVC) of 5 to 38%.

Technical Solution

In accordance with the present disclosure, the above and other objects can be accomplished by the provision of a polyimide-based film including a polyimide-based matrix and a filler dispersed in the polyimide-based matrix, the polyimide-based film having a density ratio (DR, defined as a ratio of a true density to a density-gradient tube density) of 1.10 or less, wherein the density ratio of the true density to the density-gradient tube density is calculated in accordance with the following Equation 1:

$$\text{Density Ratio (DR)} = \text{true density} / \text{density-gradient tube density} \qquad \text{<Equation 1>}$$

The polyimide-based film may have a particle volume concentration (PVC) of 5 to 38%.

The particle volume concentration (PVC) may be calculated in accordance with the following Equation 2:

$$\text{PVC (\%)} = [V_1/(V_1+V_2)]*100 \qquad \text{<Equation 2>}$$

wherein $V_1$ is the volume of the filler and $V_2$ is the volume of the matrix.

The filler may include silica ($SiO_2$).

At least a part of the silica ($SiO_2$) may be surface-treated with an organic compound having an alkoxy group.

The filler may have an average particle size of 5 to 50 nm.

The filler may be present in an amount of 5 to 50% by weight based on the total weight of the polyimide-based film.

The polyimide-based film may have a Young's modulus of 5.0 GPa or more.

The polyimide-based film may have an elongation of 15% or more.

The polyimide-based film may have an indentation hardness of 45 or more.

The polyimide-based film may have a yellowness (Yellow Index, Y.I.) of 3 or less.

The polyimide-based film may have a haze of 1% or less.

The polyimide-based film may have light transmittance of 85% or more.

In accordance with another aspect of the present disclosure, provided is a display device including a display panel and the polyimide-based film disposed on the display panel.

Advantageous Effects

According to an embodiment of the present disclosure, a polyimide-based film having excellent filler dispersibility can be produced.

In general, when a filler is dispersed in a polyimide-based film, the haze of the polyimide-based film may be aggravated. In contrast, according to one embodiment of the present disclosure, the polyimide-based film can be imparted with a density ratio of a true density to a density-gradient tube density, of 1.10 or less, due to the excellent filler dispersibility thereof. As a result, the polyimide-based film according to an embodiment of the present disclosure can exhibit excellent optical and mechanical properties.

The polyimide-based film according to an embodiment of the present disclosure can exhibit excellent optical and mechanical properties and thus can effectively protect a display surface of a display device when used as a cover window for the display device.

DESCRIPTION OF DRAWINGS

The above and other objects, features, and other advantages of the present disclosure will be more clearly understood from the following detailed description taken in conjunction with the accompanying drawings, in which.

BEST MODE

Figure 1:
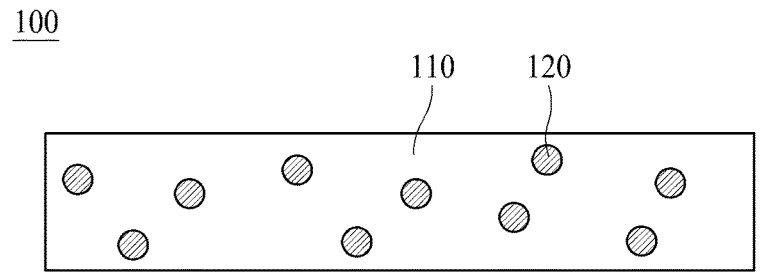
FIG. 1 is a schematic view illustrating a polyimide-based film according to an embodiment of the present disclosure.

Hereinafter, embodiments of the present disclosure will be described in detail with reference to the accompanying drawings. However, the following embodiments are illustratively provided merely for clear understanding of the present disclosure, and do not limit the scope of the present disclosure.

The shapes, sizes, ratios, angles, and numbers disclosed in the drawings for describing embodiments of the present disclosure are merely examples, and the present disclosure is not limited to the illustrated details. Like reference numerals refer to like elements throughout the present specification. In the following description, when a detailed description of relevant known functions or configurations is determined to unnecessarily obscure important points of the present disclosure, the detailed description will be omitted.

In the case in which the term such as "comprise", "have", or "include" is used in the present specification, another part may also be present, unless "only" is used. Terms in a singular form may include the plural meanings unless noted to the contrary. Also, in construing an element, the element is to be construed as including an error range even if there is no explicit description thereof.

In describing a positional relationship, for example, when the positional relationship is described as "on", "above", "below", or "next", the case of no contact therebetween may be included, unless "just" or "directly" is used.

Spatially relative terms such as "below", "beneath", "lower", "above", and "upper" may be used herein to describe the relationship of a device or an element to another device or another element as shown in the figures. It will be understood that spatially relative terms are intended to encompass different orientations of a device during the use or operation of the device, in addition to the orientation depicted in the figures. For example, if a device in one of the figures is turned upside down, elements described as "below" or "beneath" other elements would then be positioned "above" the other elements. The exemplary term "below" or "beneath" can, therefore, encompass the meanings of both "below" and "above". In the same manner, the exemplary term "above" or "upper" can encompass the meanings of both "above" and "below".

In describing temporal relationships, for example, when the temporal order is described using "after", "subsequent", "next", or "before", the case of a non-continuous relationship may be included, unless "just" or "directly" is used.

It will be understood that, although the terms "first", "second", etc. may be used herein to describe various elements, these elements should not be limited by these terms. These terms are only used to distinguish one element from another. Therefore, a first element could be termed a second element within a technical idea of the present disclosure.

It should be understood that the term "at least one" includes all combinations related with any one item. For example, "at least one among a first element, a second element, and a third element" may include all combinations of two or more elements selected from among the first, second, and third elements, as well as each of the first, second, and third elements.

Features of various embodiments of the present disclosure may be partially or completely coupled to or combined with each other, and may be variously interoperated with each other and driven technically, as will be easily understood by those skilled in the art. The embodiments of the present disclosure may be carried out independently from each other, or may be carried out together in an interrelated manner.

FIG. 1 is a schematic diagram illustrating a polyimide-based film 100 according to an embodiment of the present disclosure.

As shown in FIG. 1, the polyimide-based film 100 according to an embodiment of the present disclosure includes a polyimide-based matrix 110 and a filler 120 dispersed in the polyimide-based matrix 110.

The polyimide-based film according to an embodiment of the present disclosure has a ratio of a true density to a density-gradient tube density, which is referred to as a "density ratio" (DR), of 1.10 or less.

The density ratio (DR, defined as a ratio of a true density to a density-gradient tube density) may be calculated in accordance with the following Equation 1:

$$\text{Density Ratio (DR)} = \text{true density}/\text{density-gradient tube density} \qquad \text{<Equation 1>}$$

The term "true density" refers to a solid density, meaning a density of only a part completely filled with a material, excluding the pores between particles. According to an embodiment of the present disclosure, the true density refers to the density of only the part filled with the polyimide-based matrix 110 and the filler 120, excluding the pores.

The true density may vary depending on the size of the specimen of the film 100 to be measured during measurement. Therefore, according to an embodiment of the present disclosure, the true density of the film 100 may be obtained through powderization analysis.

Specifically, a specimen of the film 100 ($10 \times 10$ cm$^2$) is finely cut into segments having a size of $1 \times 1$ cm$^2$ or less and charged along with iron beads (pulverizer) into a sample holder. A cryogenic crusher (Japan Analytical Industry, JFC-300) is filled more than 2/3 full with liquid nitrogen, and the sample holder containing the cut specimen is mounted on the cryogenic crusher and then the chamber is closed. The specimen is pulverized using the cryogenic crusher for a running time of 15 minutes or more, after pre-cooling for 15 minutes. The true density of the pulverized specimen of the film 100 is measured seven times using an AccuPyc 1340 pycnometer produced by Micromeritics Co., Ltd. (using helium gas). The average of the remaining true density values, after exclusion of the highest and lowest values from the measured true densities of the pulverized film 100, corresponds to the true density of the film 100 in the present disclosure.

The term "density-gradient tube density" refers to a density measured using a density-gradient tube. The density-gradient tube is a means used to measure density.

According to an embodiment of the present disclosure, the density-gradient tube density of the film 100 may be obtained using a density-gradient tube in accordance with the ASTM D1505 standard.

Specifically, the density-gradient tube has a density gradient created between one liquid having a large specific gravity disposed in a lower part of a glass cylinder and another liquid having a small specific gravity disposed in an upper part thereof. When the specimen of the film 100 is placed in such a density-gradient tube, it is hung and suspended at a position corresponding to the density thereof, and the density-gradient tube density of the specimen of the film 100 can be determined based on the density corresponding to the position. The gradient of the density-gradient tube density is determined by a method of placing a spherical glass float having a known specific gravity, a method including measuring the specific gravity of various concentrations of zinc chloride aqueous solution in advance and then fixing the same in the density-gradient tube, or by colorimetric methods using dyes that are dissolved in only one among a plurality of liquids having different specific gravities of the density-gradient tube.

Figure 2:
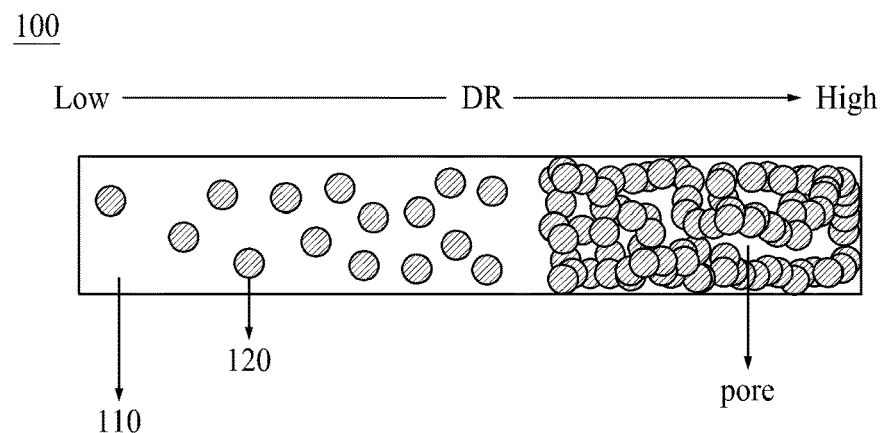
FIG. 2 illustrates the difference in pores inside the polyimide-based film according to a density ratio (DR, defined as a ratio of a true density to a density-gradient tube density)

Hereinafter, the density ratio (DR) of the true density to the density-gradient tube density of the film 100 will be described in detail with reference to FIG. 2. FIG. 2 shows the difference in pores inside the film 100 according to the density ratio (DR) of the true density to the density-gradient tube density of the film 100.

The density ratio (DR) of the true density to the density-gradient tube density of the film 100 represents the amount of pores present in the film 100 (in other words, the porosity thereof), based on the ratio of the true density to the density-gradient tube density of the film 100. The true density refers to the density of the matrix 110 and the filler 120 excluding the pores in the film 100, the density-gradient tube density represents the density of the film 100 including the pores, and the porosity of the film 100 can be represented by the ratio of the true density to the density-gradient tube density.

As shown in FIG. 2, as the density ratio (DR) of the true density to the density-gradient tube density of the film 100 increases, the pores in the film 100 increase, and conversely, as the density ratio (DR) of the true density to the density-gradient tube density decreases, the pores in the film 100 decrease.

In general, when the film 100 includes the filler 120, a difference in the pores in the film 100 may occur depending on the degree of dispersion of the filler 120. When the particles of the filler 120 aggregate due to low dispersibility of the filler 120, the space between the filler particles may not be sufficiently filled with the matrix 110, so pores may be formed therein. Conversely, when the particles of the filler 120 are well dispersed, the matrix 110 can sufficiently fill the spaces between the particles of the filler 120 in the state in which the matrix 110 and the filler 120 are sufficiently well mixed, so the pores decrease.

As the pores in the film 100 decrease, the tensile strength, Young's modulus, elongation, indentation hardness, and light transmittance of the film 100 increase, and yellowness (Yellow Index, Y.I.) and haze decrease. As a result, mechanical properties such as abrasion resistance and flexibility of the film 100 and optical properties such as light transmittance and visibility of the film 100 are excellent.

According to an embodiment of the present disclosure, the density ratio (DR) of the true density to the density-gradient tube density of the film 100 is 1.10 or less.

When the density ratio (DR) of the true density to the density-gradient tube density is greater than 1.10, the effect of filling the film 100 with the filler 120 decreases and the effect of improving the hardness and Young's modulus of the film 100 decreases. In addition, an increase in pores in the film 100 due to the aggregation of the filler 120 disadvantageously causes a decrease in the elongation and indentation hardness of the film 100. In addition, the aggregation of the filler 120 causes an increase in the haze of the film 100.

The polyimide-based film 100 according to an embodiment of the present disclosure has a particle volume concentration (PVC) of 5 to 38%.

The particle volume concentration (PVC) may be calculated in accordance with the following Equation 2:

$$\text{PVC (\%)} = [V_1/(V_1+V_2)]*100 \qquad \text{<Equation 2>}$$

wherein $V_1$ is the volume of the filler and $V_2$ is the volume of the matrix.

Figure 3:
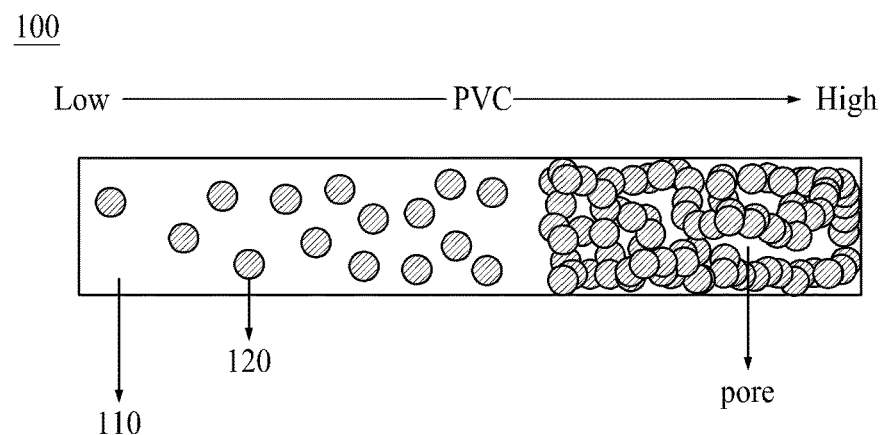
FIG. 3 illustrates the difference in pores inside the polyimide-based film according to the particle volume concentration (PVC) of the polyimide-based film.

Hereinafter, the particle volume concentration (PVC) will be described in detail with reference to FIG. 3. FIG. 3 illustrates the difference in pores inside the film 100 according to the particle volume concentration (PVC) of the film 100.

The particle volume concentration (PVC) represents the ratio of the volume occupied by the filler 120 to the total volume of the matrix 110 and the filler 120 in the film 100 as a percentage (%).

As shown in FIG. 3, when the particle volume concentration (PVC) of the film 100 decreases, the pores of the film 100 decrease, and when the particle volume concentration (PVC) increases, the pores of the film 100 increase.

As the particle volume concentration (PVC) of the film 100 increases, the volume occupied by the filler 120 in the film 100 increases, and the average distance between the filler particles decreases. When the average distance between the filler particles is shortened, it is difficult for the matrix 110 to fill the space between the filler particles, and thus the pores increase.

The volume ($V_1$) of the filler may be calculated by dividing the mass of the filler by the density. Specifically, the volume ($V_1$) of the filler may be calculated by measuring each of the mass and the density of the filler included in the film 100. For example, the mass of the filler may be determined by measuring the weight of the filler that is added when the film 100 is produced. The density of the filler may be measured using a method of measuring the true density or a method of measuring the density-gradient tube density.

The volume ($V_2$) of the matrix may be calculated by dividing the mass of the matrix by the density thereof. Specifically, the volume ($V_2$) of the matrix may be calculated by measuring each of the mass and density of the matrix included in the film 100. For example, the mass of the matrix may be determined by measuring the weight of the matrix that is added when the film 100 is produced. The density of the matrix may be measured using the method of measuring the true density or the method of measuring the density-gradient tube density.

According to one embodiment of the present disclosure, the film 100 has a particle volume concentration (PVC) of 5 to 38%.

When the particle volume concentration (PVC) is less than 5%, the effect of improving the mechanical properties of the film 100 by the filler 120 is insufficient. In addition, when the particle volume concentration (PVC) is greater than 38%, a discontinuity occurs between the contact surface of the filler 120 with the matrix 110, and thus elongation and indentation hardness decrease.

According to an embodiment of the present disclosure, the polyimide-based matrix 110 is light-transmissive. In addition, the polyimide-based matrix 110 is flexible. For example, the polyimide-based matrix 110 may be bendable, foldable and rollable.

The polyimide-based matrix 110 includes a polyimide-based resin. The polyimide-based matrix 110 may include, for example, a polyimide-based resin.

The polyimide-based matrix 110 according to an embodiment of the present disclosure may be prepared from monomer components including dianhydride and diamine.

More specifically, the polyimide-based matrix 110 according to an embodiment of the present disclosure may have an imide repeating unit formed from dianhydride and diamine.

However, the polyimide-based matrix 110 according to an embodiment of the present disclosure is not limited thereto. In addition, the polyimide-based matrix 110 according to an embodiment of the present disclosure may be prepared from monomer components further including a dicarbonyl compound, in addition to dianhydride and diamine. Accordingly, the polyimide-based matrix 110 according to an embodiment of the present disclosure may have an imide repeating unit and an amide repeating unit. The polyimide-based matrix 110 having an imide repeating unit and an amide repeating unit is, for example, a polyamide-imide resin.

Accordingly, the polyimide-based matrix 110 according to an embodiment of the present disclosure may include a polyimide resin or a polyamide-imide resin.

According to an embodiment of the present disclosure, the polyimide-based resin used as the polyimide-based matrix 110 may have excellent mechanical and optical properties.

The polyimide-based matrix 110 may have a thickness sufficient to enable the polyimide-based film 100 to protect the display panel. For example, the polyimide-based matrix 110 may have a thickness of 10 to 100 μm.

The polyimide-based matrix 110 may have an average light transmittance of 85% or more and a yellowness (Yellow Index, Y.I.) of 5 or less in a visible light region, measured using a UV spectrophotometer based on a thickness of 10 to 100 μm.

According to an embodiment of the present disclosure, the filler 120 may be an inorganic material or an organic material. The filler 120 may have a particle shape. According to an embodiment of the present disclosure, for example, an inorganic filler may be used.

According to an embodiment of the present disclosure, the filler 120 may include at least one of silica ($SiO_2$), zirconia ($ZrO_2$), alumina ($Al_2O_3$), titanium dioxide ($TiO_2$), styrene, or acryl. For example, inorganic silica ($SiO_2$) particles may be used as the filler 120.

According to an embodiment of the present disclosure, at least a part of silica ($SiO_2$) used as the filler 120 may be surface-treated. More specifically, the surface-treated silica ($SiO_2$) particles may be used as the filler 120.

According to an embodiment of the present disclosure, at least a part of the silica ($SiO_2$) used as the filler 120 may be surface-treated with an organic compound having an alkoxy group. For example, silica ($SiO_2$) particles surface-treated with at least one of substituted or unsubstituted alkylalkoxysilane or phenylalkoxysilane may be used as the filler 120.

Specifically, silica ($SiO_2$) particles surface-treated with methylalkoxysilane, ethylalkoxysilane, or phenylalkoxysilane may be used as the filler 120. More specifically, silica ($SiO_2$) particles surface-treated with trimethoxy(methyl)silane and phenyltrimethoxysilane may be used as the filler 120.

According to an embodiment of the present disclosure, the filler 120 may have a unit structure represented by the following Formula 1 to Formula 6:

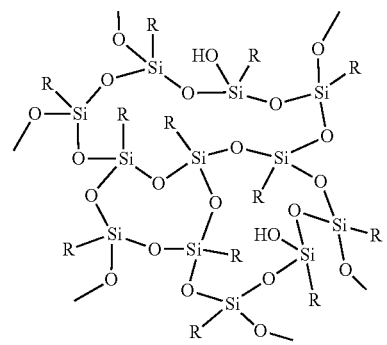

[Formula 1]

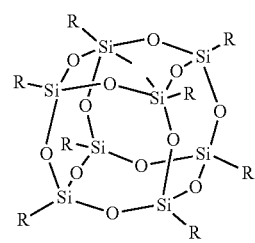

[Formula 2]

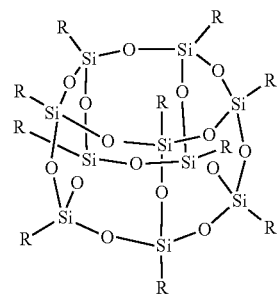

[Formula 3]

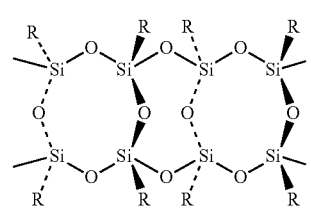

[Formula 4]

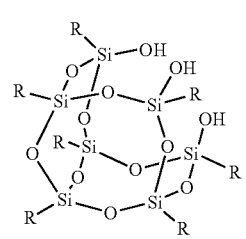

[Formula 5]

-continued

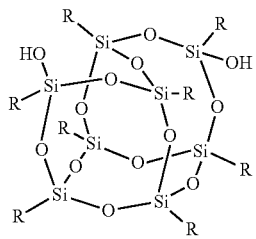

[Formula 6]

wherein R is each independently at least one of an alkyl group having 1 to 10 carbon atoms, an alkoxy group having 1 to 10 carbon atoms, a cycloalkyl group having 3 to 10 carbon atoms, or a phenyl group having 6 to 18 carbon atoms.

The polyimide-based film 100 according to an embodiment of the present disclosure has excellent mechanical and optical properties.

With respect to the optical properties, the polyimide-based film 100 according to an embodiment of the present disclosure may have a yellowness (Yellow Index, Y.I.) of 3 or less. In addition, the polyimide-based film 100 according to an embodiment of the present disclosure may have a haze of 1% or less. The polyimide-based film 100 according to an embodiment of the present disclosure may have a light transmittance of 85% or more.

In addition, with respect to mechanical properties, the polyimide-based film 100 according to an embodiment of the present disclosure may have a Young's modulus of 5.0 GPa or more. In addition, the polyimide-based film 100 according to an embodiment of the present disclosure may have an elongation of 15% or more. In addition, the polyimide-based film 100 according to an embodiment of the present disclosure may have an indentation hardness of 45 or more.

According to an embodiment of the present disclosure, in order for the polyimide-based film 100 to have excellent optical and mechanical properties, the particle size of the filler 120, the content of the filler 120, and the inter-particle spacing of the filler 120 may be controlled.

In addition, in order for the filler 120 to be uniformly mixed in the polyimide-based matrix 110 so that the polyimide-based film 100 exhibits excellent optical and mechanical properties, an embodiment of the present disclosure provides a novel method of mixing the polyimide-based polymer constituting the polyimide-based matrix 110 with the filler 120.

According to an embodiment of the present disclosure, the filler 120 may have an average particle diameter of 5 to 50 nm. When the average particle diameter of the filler 120 is less than 5 nm, the dispersibility of the filler 120 may be deteriorated and particles of the filler 120 may aggregate. On the other hand, when the average particle diameter of the filler 120 is higher than 50 nm, the optical properties of the polyimide-based film 100 including the filler 120 may be deteriorated. For example, when a filler 120 having an average particle diameter of more than 50 nm is included in excess, the haze of the polyimide-based film 100 may increase.

In addition, when the average particle diameter of the filler 120 is less than 5 nm, due to the aggregation of the filler 120, the mechanical strength of the polyimide-based film 100 is deteriorated in the portion where the aggregation of the filler 120 occurs, and thus the tensile strength, Young's modulus, and indentation hardness of the polyimide-based film 100 may be deteriorated. When the average particle diameter of the filler 120 is higher than 50 nm, the elongation of the polyimide-based film 100 may be less than 15%.

In addition, when the average particle diameter of the filler 120 is less than 5 nm, the dispersibility of the filler 120 may decrease, and when the average particle diameter of the filler 120 is higher than 50 nm, sufficient spacing between the particles of the filler 120 is not secured. Therefore, the density ratio (DR) of true density to the density-gradient tube density may be higher than 1.10.

According to another embodiment of the present disclosure, the filler 120 may have an average particle diameter of 10 to 20 nm, or may have an average particle diameter of 10 to 15 nm.

When the polyimide-based film 100 includes the filler 120 having a nanometer-scale particle size, the optical properties of the polyimide-based film 100 can be improved through light scattering by the filler 120. In addition, when the polyimide-based film 100 includes the filler 120, the mechanical properties of the polyimide-based film 100 can be improved.

According to an embodiment of the present disclosure, the content of the filler 120 may be in the range of 5 to 50% by weight based on the total weight of the polyimide-based film 100.

When the content of the filler 120 is less than 5% by weight based on the total weight of the polyimide-based film 100, the light-scattering effect based on the filler 120 is insufficient, and almost no light transmittance improvement effect of the polyimide-based film 100 is obtained. In addition, when the content of the filler 120 is less than 5% by weight based on the total weight of the polyimide-based film 100, the effect of improving the tensile strength, Young's modulus, elongation, and hardness of the polyimide-based film 100 may be insufficient.

On the other hand, when the content of the filler 120 is higher than 50% by weight based on the total weight of the polyimide-based film 100, the dispersibility of the filler 120 may be deteriorated and the haze of the polyimide-based film 100 may be aggravated, whereby the excess filler 120 blocks light, and thus the light transmittance of the polyimide-based film 100 may be deteriorated.

Figure 4:
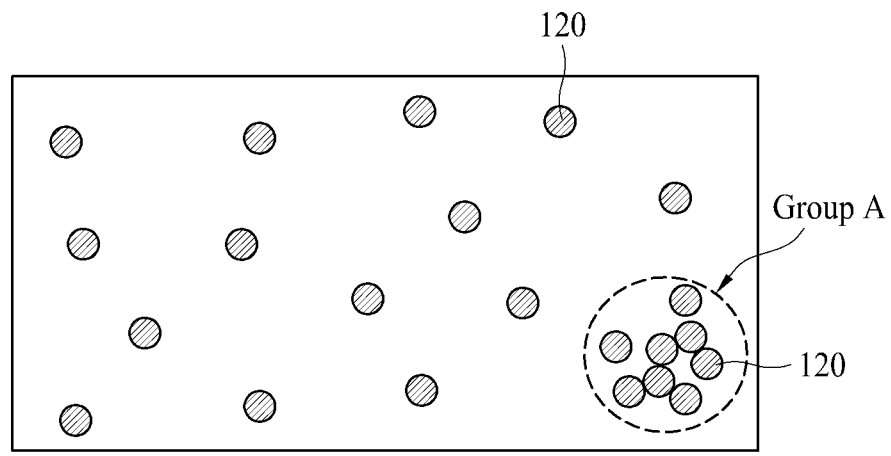
FIG. 4 is a schematic diagram illustrating the state in which a filler is dispersed in the polyimide-based film according to an embodiment of the present disclosure.

FIG. 4 is a schematic diagram illustrating the state in which the filler 120 is dispersed in the polyimide-based film 100 according to an embodiment of the present disclosure.

As shown in FIG. 4, some of the particles of the filler 120 are spaced apart from one another and dispersed, whereas the remainder thereof form aggregates. In FIG. 4, "Group A" represents the particles of the filler 120 forming an aggregate. The particles of the filler 120, other than particles of the filler present in "Group A", are not aggregated but dispersed (parts other than Group A). As the number of particles of the filler 120 forming an aggregate as in "Group A" of FIG. 4 decreases, the uniformity of the particles of the filler 120 dispersed in the polyimide-based film 100 increases.

When the amount of the filler 120 forming an aggregate, such as "Group A" of FIG. 4, is small, the density ratio (DR) of the true density to the density-gradient tube density is 1.10 or less, and thus the polyimide-based film 100 can exhibit excellent tensile strength, Young's modulus, elongation, and indentation hardness. In addition, when the amount of the filler 120 forming an aggregate, such as "Group A", is small, the particle volume concentration (PVC) is in the range of 5 to 38%, and the polyimide-based film 100 can exhibit excellent tensile strength and Young's modulus.

In general, in the case where the filler 120 is included, when the filler 120 is not sufficiently uniformly dispersed, the mechanical properties and optical properties of the polyimide-based film 100 may be deteriorated; for example, the tensile strength, Young's modulus, elongation, indentation hardness and light transmittance of the polyimide-based film 100 are deteriorated, and yellowness (Yellow Index, Y.I.) and haze increase. However, according to an embodiment of the present disclosure, by adjusting the density ratio (DR) of the true density to the density-gradient tube density to 1.10 or less, deterioration in the tensile strength, Young's modulus, elongation, and indentation hardness of the polyimide-based film 100 can be prevented and an increase in yellowness (Yellow Index, Y.I.) and haze can be prevented.

In addition, according to an embodiment of the present disclosure, the deterioration in tensile strength and Young's modulus of the polyimide-based film 100 can be prevented by adjusting the particle volume concentration (PVC) to 5 to 38%.

According to an embodiment of the present disclosure, by adjusting the density ratio (DR) of the true density to the density-gradient tube density of the polyimide-based film 100 to 1.10 or less, a Young's modulus of 5.0 GPa or more can be imparted to the polyimide-based film 100.

In addition, according to an embodiment of the present disclosure, the polyimide-based film 100 may have an elongation of 15% or more.

In addition, according to an embodiment of the present disclosure, the polyimide-based film 100 may have an indentation hardness of 45 or more.

In addition, according to an embodiment of the present disclosure, the polyimide-based film 100 may have light transmittance of 85% or more.

In addition, according to an embodiment of the present disclosure, the polyimide-based film 100 may have haze of 1% or less.

In addition, according to an embodiment of the present disclosure, the polyimide-based film 100 may have a yellowness (Yellow Index, Y.I.) of 3.0 or less.

Figure 5:
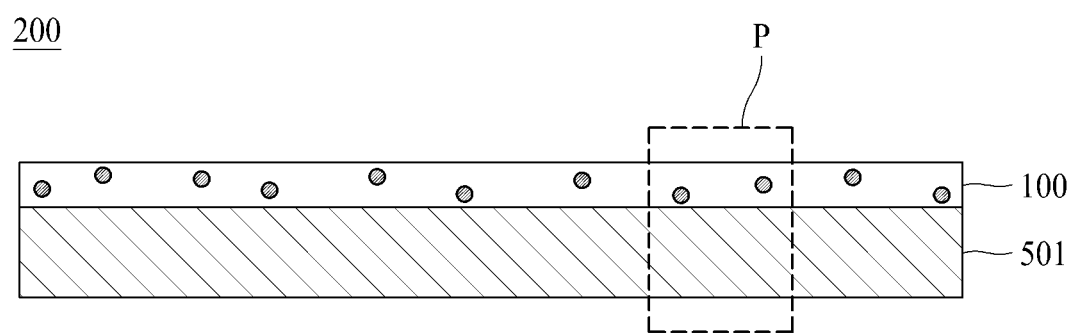
FIG. 5 is a cross-sectional view illustrating a part of a display device according to another embodiment of the present disclosure.
Figure 6:
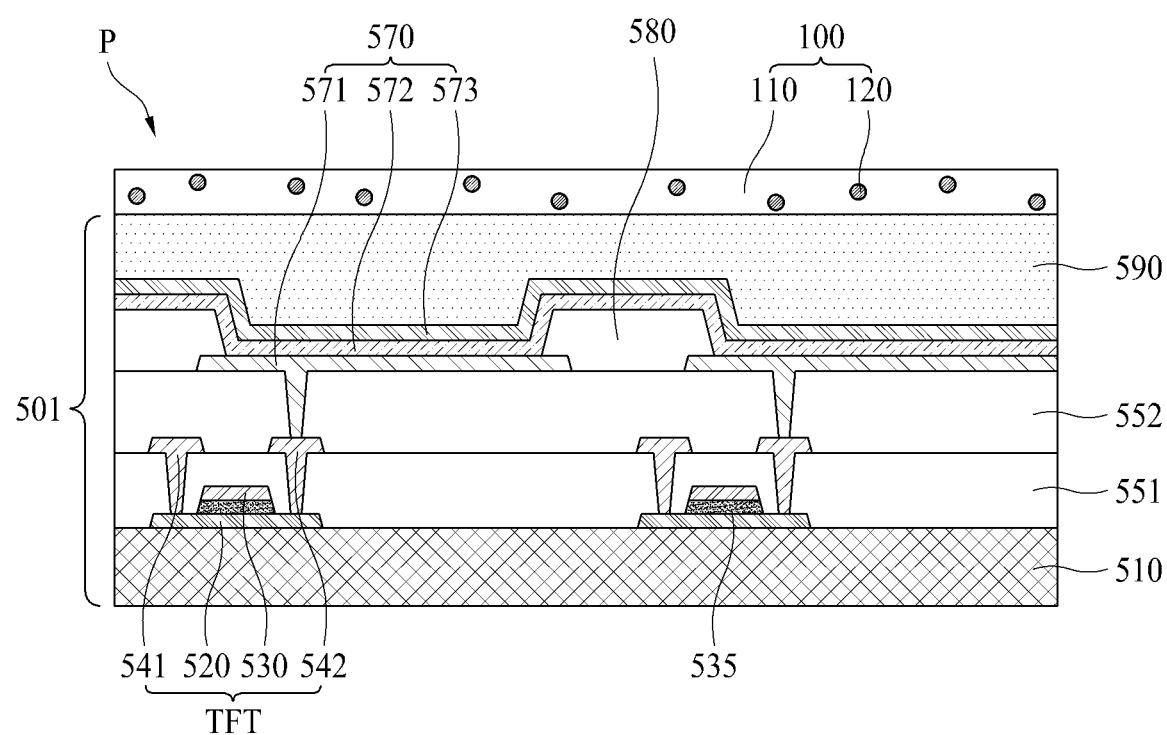
FIG. 6 is an enlarged cross-sectional view illustrating the part "P" of FIG. 5.

FIG. 5 is a cross-sectional view illustrating a part of a display device 200 according to another embodiment, and FIG. 6 is an enlarged cross-sectional view of part "P" in FIG. 5.

Referring to FIG. 5, the display device 200 according to another embodiment of the present disclosure includes a display panel 501 and a polyimide-based film 100 on the display panel 501.

Referring to FIGS. 5 and 6, the display panel 501 includes a substrate 510, a thin film transistor TFT on the substrate 510, and an organic light-emitting device 570 connected to the thin film transistor TFT. The organic light-emitting device 570 includes a first electrode 571, an organic light-emitting layer 572 on the first electrode 571, and a second electrode 573 on the organic light-emitting layer 572. The display device 200 shown in FIGS. and 6 is an organic light-emitting display device.

The substrate 510 may be formed of glass or plastic. Specifically, the substrate 510 may be formed of plastic such as a polyimide-based resin or a polyimide-based film. Although not shown, a buffer layer may be disposed on the substrate 510.

The thin film transistor TFT is disposed on the substrate 510. The thin film transistor TFT includes a semiconductor layer 520, a gate electrode 530 that is insulated from the semiconductor layer 520 and overlaps at least a part of the semiconductor layer 520, a source electrode 541 connected to the semiconductor layer 520, and a drain electrode 542 that is spaced apart from the source electrode 541 and is connected to the semiconductor layer 520.

Referring to FIG. 6, a gate insulating layer 535 is disposed between the gate electrode 530 and the semiconductor layer 520. An interlayer insulating layer 551 may be disposed on the gate electrode 530, and a source electrode 541 and a drain electrode 542 may be disposed on the interlayer insulating layer 551.

A planarization layer 552 is disposed on the thin film transistor TFT to planarize the top of the thin film transistor TFT.

The first electrode 571 is disposed on the planarization layer 552. The first electrode 571 is connected to the thin film transistor TFT through a contact hole provided in the planarization layer 552.

A bank layer 580 is disposed on the planarization layer 552 in a part of the first electrode 571 to define pixel areas or light-emitting areas. For example, the bank layer 580 is disposed in the form of a matrix at the boundaries between a plurality of pixels to define the respective pixel regions.

The organic light-emitting layer 572 is disposed on the first electrode 571. The organic light-emitting layer 572 may also be disposed on the bank layer 580. The organic light-emitting layer 572 may include one light-emitting layer or two light-emitting layers stacked in a vertical direction. Light having any one color among red, green, and blue may be emitted from the organic light-emitting layer 572, and white light may be emitted therefrom.

The second electrode 573 is disposed on the organic light-emitting layer 572.

The first electrode 571, the organic light-emitting layer 572, and the second electrode 573 may be stacked to constitute the organic light-emitting device 570.

Although not shown, when the organic light-emitting layer 572 emits white light, each pixel may include a color filter for filtering the white light emitted from the organic light-emitting layer 572 based on a particular wavelength. The color filter is formed in the light path.

A thin film encapsulation layer 590 may be disposed on the second electrode 573. The thin film encapsulation layer 590 may include at least one organic layer and at least one inorganic layer, and the at least one organic layer and the at least one inorganic layer may be alternately disposed.

The polyimide-based film 100 is disposed on the display panel 501 having the stack structure described above. The polyimide-based film 100 includes the polyimide-based matrix 110 and the filler 120 dispersed in the polyimide-based matrix 110.

The polyimide-based film 100 according to an embodiment of the present disclosure may be produced by a hybrid mixing method using a combination of solution-solution mixing and solution-powder mixing.

According to an embodiment of the present disclosure, the method of producing the polyimide-based film 100 includes preparing a polyimide-based resin powder, dissolving a first amount of the polyimide-based resin powder in a first solvent to prepare a polyimide-based resin solution, dispersing a filler in a second solvent to prepare a filler dispersion, mixing the filler dispersion with the polyimide-based resin solution to prepare a first mixed solution, and adding a second amount of the polyimide-based resin powder to the first mixed solution, followed by dissolving, to prepare a second mixed solution.

According to an embodiment of the present disclosure, the polyimide-based resin powder is separated into at least two aliquots and mixed with the filler dispersion.

Specifically, the first amount of the polyimide-based resin powder is dissolved in the first solvent and is mixed in the form of a polyimide-based resin solution with the filler dispersion. The first amount may be 0.5 to 10% of the weight of the filler, preferably 1 to 5% thereof.

In addition, the second amount of the polyimide-based resin powder is added in a powder form. Specifically, the second amount of the polyimide-based resin powder may be added in a powder form to the first mixed solution, which is prepared by mixing the filler dispersion with the polyimide-based resin solution.

The second amount of the polyimide-based resin powder may be 10 to 200 times the first amount. More specifically, the second amount of the polyimide-based resin powder may be 60 to 200 times the first amount.

According to one embodiment of the present disclosure, before adding the second amount of the polyimide-based resin powder to the first mixed solution, the method may further include adding a third solvent to the first mixed solution. The third solvent may be the same as or different from the first solvent. According to an embodiment of the present disclosure, the third solvent may be the same as the first solvent.

DMAc (N,N-dimethylacetamide) may be used as the first solvent. DMAc (N,N-dimethylacetamide) or methyl ethyl ketone (MEK) may be used as the second solvent. DMAc (N,N-dimethylacetamide) may be used as the third solvent. However, embodiments of the present disclosure are not limited thereto, and other known solvents may be used as the first solvent, the second solvent, and the third solvent.

According to an embodiment of the present disclosure, first, a part (the first amount) of the polyimide-based resin powder is dissolved in a solvent and is then mixed with the filler dispersion. As a result, the dispersibility of the filler is improved.

For reference, when the polyimide-based resin powder is directly injected into the filler dispersion in which the filler is dispersed, the solvent instantly penetrates the inside of the powder from the surface of the powder, at which time the concentration around the surface of the powder increases instantly, whereby particles of the filler may aggregate.

On the other hand, according to an embodiment of the present disclosure, by first adding a polyimide-based resin solution, prepared by dissolving the polyimide-based resin powder, to a filler dispersion containing a solvent, the polymer chains of the polyimide-based resin dispersed between the filler particles can prevent aggregation of the filler particles. Then, even if the second amount of the polyimide-based resin powder is also added, aggregation between filler particles does not occur. As a result, aggregation of the filler can be prevented, and the dispersibility of the filler can be improved.

According to an embodiment of the present disclosure, the polyimide-based film 100 including the filler 120 uniformly dispersed therein may be produced using a hybrid mixing method in which solution-solution mixing and solution-powder mixing are combined.

According to an embodiment of the present disclosure, the high degree of freedom of the filler 120 and the light-transmitting resin can be maintained, so an environment facilitating dispersion can be created. As a result, the filler 120 can be bonded to the light-transmitting resin in a high degree of freedom, and a polyimide-based film 100 in which the filler 120 is uniformly dispersed in the matrix 110 formed by the light-transmitting resin can be produced.

According to an embodiment of the present disclosure, silica particles may be used as the filler 120. The silica particles may be prepared, for example, from tetraethyltriethoxysilane.

Specifically, silica particles ($SiO_2$) having an average particle diameter of about 20 nm may be prepared by injecting ethanol and tetraethyltriethoxysilane (TEOS, $Si(OC_2H_5)_4$) into a reactor, stirring the ingredients at room temperature, adding $NH_4OH$ thereto, stirring the ingredients, filtering the resulting reaction product, washing the filtrate with ethanol, and drying the residue under reduced pressure.

A silica dispersion may be used as the dispersion of the filler 120. The silica dispersion may be prepared, for example, by injecting dimethylacetamide (DMAc) and silica particles into a reactor, followed by stirring.

Hereinafter, the present disclosure will be described in more detail with reference to Preparation Examples and Examples. However, the Preparation Examples and Examples should not be construed as limiting the scope of the present disclosure.

Preparation Example 1: Preparation of Polyimide-Based Polymer Solid 776.655 g of N,N-dimethylacetamide (DMAc) was charged in a 1 L reactor equipped with a stirrer, a nitrogen injector, a dropping funnel, a temperature controller, and a cooler while nitrogen was passed through the reactor. The temperature of the reactor was adjusted to 25° C., 54.439 g (0.17 mol) of TFDB was dissolved therein, and the resulting solution was maintained at 25° C. 15.005 g (0.051 mol) of BPDA was added thereto, followed by stirring for 3 hours to thoroughly dissolve the BPDA, and then 22.657 g (0.051 mol) of 6FDA was added thereto and completely dissolved therein. The reactor temperature was dropped to 10° C., 13.805 g (0.068 mol) of TPC was added thereto, and the reaction was allowed to proceed at 25° C. for 12 hours to obtain a polymer solution having a solid concentration of 12% by weight.

17.75 g of pyridine and 22.92 g of acetic anhydride were added to the obtained polymer solution, followed by stirring for 30 minutes and then further stirring at 70° C. for 1 hour. The result was allowed to cool to room temperature, 20 L of methanol was added to the resulting polymer solution to precipitate a solid, and the precipitated solid was filtered, pulverized, washed again with 2 L of methanol, and then dried at 100° C. in a vacuum for 6 hours to obtain a powdery polyimide-based polymer solid. The polyimide-based polymer solid prepared herein was a polyamide-imide polymer solid.

Example 1

35.42 parts by weight of N,N-dimethylacetamide (DMAc) (first solvent) was charged in a 1 L reactor, followed by stirring for a predetermined time while the temperature of the reactor was maintained at 10° C. Then, 0.36 parts by weight (a first amount) of polyamide-imide as a solid powder (polyimide-based resin powder) prepared in Preparation Example 1 was added thereto, followed by stirring for one hour and then elevating the temperature to 25° C. to prepare a polyimide-based resin solution as a liquid.

23.85 parts by weight of silica dispersion A (SSD-330T, Ranco), in which silica particles having an average particle diameter of 10 nm were dispersed in an amount of 30 wt % in DMAc (N,N-dimethylacetamide) solution (second solvent), was charged in another 1 L reactor and the prepared liquid polyimide-based resin solution was slowly injected using a cylindrical pump for 1 hour while the temperature of the reactor was maintained at 25° C. to prepare a first mixed solution in which the silica dispersion was mixed with the polyimide-based resin solution.

348.23 parts by weight of DMAc was added as a third solvent to the first mixed solution, followed by stirring. Then, 64.04 parts by weight (second amount) of polyamide-imide as a solid powder (polyimide-based resin powder) prepared in Preparation Example 1 was added thereto, followed by stirring, to prepare a second mixed solution. The second mixed solution was a polyimide-based resin solution in which silica particles were dispersed.

The obtained second mixed solution was cast. A casting substrate was used for casting. There is no particular limitation as to the type of the casting substrate. The casting substrate may be a glass substrate, a stainless (SUS) substrate, a Teflon substrate, or the like. According to an embodiment of the present disclosure, the casting substrate may be, for example, a glass substrate.

Specifically, the obtained second mixed solution was applied to a glass substrate, cast, and dried with hot air at 120° C. for 30 minutes to produce a film, and then the produced film was peeled off the glass substrate and fixed to the frame with a pin.

The frame to which the film was fixed was placed in a vacuum oven, slowly heated from 100° C. to 280° C. for 2 hours, slowly cooled, and then separated from the frame to obtain a polyimide-based film. The polyimide-based film was further heat-treated at 250° C. for 5 minutes.

As a result, production of a polyimide-based film 100 having a thickness of 50 μm and including a polyimide-based matrix 110 and a silica-based filler 120 dispersed in the polyimide-based matrix 110 was completed.

Examples 2 to 7

The polyimide-based films of Examples 2 to 7 were produced in the same manner as in Example 1 by changing only the type of the silica dispersion, the total amount, the first amount and the second amount of the silica dispersion, the amount of the first solvent, and the amount of the third solvent.

The details of the silica dispersion, the total amount, the first amount and the second amount of the silica dispersion, the amount of the first solvent, and the amount of the third solvent of Examples 1 to 7 are set forth in the following Table 1.

Comparative Example 1

A polyimide-based film 100 was produced in the same manner as in Example 1 by changing only the type of the silica dispersion, the total amount, the first amount and the second amount of the silica dispersion, the amount of the first solvent, and the amount of the third solvent.

The details of the silica dispersion, the total amount, the first amount and the second amount of the silica dispersion, the amount of the first solvent, and the amount of the third solvent of Comparative Example 1 are set forth in the following Table 1.

Comparative Example 2

35.80 parts by weight of silica dispersion C (50nmSP-AD1, Admatechs) in which silica particles having an average particle diameter of 50 nm were dispersed in an amount of 20 wt % in a DMAc (N,N-dimethylacetamide) solution (second solvent) was charged in another 1 L reactor, and 371.73 parts by weight of DMAc (third solvent) was added thereto, followed by stirring. Then, 64.40 parts by weight (second amount) of the polyamide-imide (polyimide-based resin powder) prepared as a solid powder in Preparation Example 1 was added to the stirred solution, followed by further stirring, to prepare a mixed solution in which the silica dispersion was mixed with the polyimide-based resin. The mixed solution was a polyimide-based resin solution in which silica particles were dispersed.

The obtained mixed solution was cast. Casting and subsequent processes were performed in the same manner as in Example 1 to produce a polyimide-based film 100.

Comparative Example 3

35.80 parts by weight of silica dispersion D (DMAc-ST-ZL, Nissan) in which silica particles having an average particle diameter of 70 nm were dispersed in an amount of 20 wt % in a DMAc (N,N-dimethylacetamide) solution (second solvent) was charged in another 1 L reactor, and 371.06 parts by weight of DMAc (third solvent) was added thereto, followed by stirring. Then, 64.40 parts by weight (second amount) of the polyamide-imide (polyimide-based resin powder) prepared as the solid powder in Preparation Example 1 was added to the stirred solution, followed by further stirring, to prepare a mixed solution in which the silica dispersion was mixed with the polyimide-based resin. The mixed solution was a polyimide-based resin solution in which silica particles were dispersed.

The obtained mixed solution was cast. Casting and subsequent processes were performed in the same manner as in Example 1 to produce a polyimide-based film 100.

Comparative Examples 4 to 7

The polyimide-based films 100 of Comparative Examples 4 to 7 were produced in the same manner as in Example 1 by changing only the type of the silica dispersion, the total amount, the first amount and the second amount of the silica dispersion, the amount of the first solvent, and the amount of the third solvent.

The details of the silica dispersion, the total amount, the first amount and the second amount of the silica dispersion, the amount of the first solvent, and the amount of the third solvent of Comparative Examples 4 to 7 are set forth in the following Table 1.

TABLE 1

| Item | Details of silica dispersion | Total amount of silica dispersion (parts by weight) | First amount of silica dispersion (parts by weight) | Amount of first solvent (parts by weight) | Second amount of silica dispersion (parts by weight) | Amount of third solvent (parts by weight) |
|---|---|---|---|---|---|---|
| Example 1 | Silica dispersion A (SSD_330T, Ranco) average particle size: 10 nm amount of silica particles present in dispersion: 30 wt % | 23.85 | 0.36 | 35.42 | 64.04 | 348.23 |
| Example 2 | Silica dispersion A (SSD_330T, Ranco) average particle size: 10 nm amount of silica particles present in dispersion: 30 wt % | 115.60 | 1.73 | 171.67 | 62.67 | 284.01 |
| Example 3 | Silica dispersion A (SSD_330T, Ranco) average particle size: 11 nm amount of silica particles present in dispersion: 30 wt % | 175.70 | 2.64 | 260.91 | 61.76 | 241.94 |
| Example 4 | Silica dispersion C (50 nmSP-AD1, Admatechs) average particle size: 50 nm amount of silica particles present in dispersion: 20 wt % | 35.80 | 0.36 | 35.44 | 64.04 | 336.29 |
| Example 5 | Silica dispersion B (SSK230U2, Ranco) average particle size: 30 nm amount of silica particles present in dispersion: 30 wt % | 92.00 | 1.38 | 136.62 | 63.02 | 300.53 |
| Example 6 | Silica dispersion A (SSD_330T, Ranco) average particle size: 10 nm amount of silica particles present in dispersion: 30 wt % | 115.60 | 0.35 | 34.33 | 64.05 | 284.01 |
| Example 7 | Silica dispersion A (SSD_330T, Ranco) average particle size: 10 nm amount of silica particles present in dispersion: 30 wt % | 92.0 | 2.76 | 273.24 | 61.64 | 300.53 |
| Comparative Example 1 | Silica dispersion A (SSD_330T, Ranco) average particle size: 10 nm amount of silica particles present in dispersion: 30 wt % | 262.40 | 3.94 | 389.66 | 60.46 | 181.25 |
| Comparative Example 2 | Silica dispersion C (50 nmSP-AD1, Admatechs) average particle size: 50 nm amount of silica particles present in dispersion: 20 wt % | 35.80 | 0.00 | 0.00 | 64.40 | 371.73 |
| Comparative Example 3 | Silica dispersion D (DMAc-ST-ZL, Nissan) average particle size: 70 nm amount of silica particles present in dispersion: 20 wt % | 35.80 | 0.00 | 0.00 | 64.40 | 371.06 |

TABLE 1-continued

| Item | Details of silica dispersion | Total amount of silica dispersion (parts by weight) | First amount of silica dispersion (parts by weight) | Amount of first solvent (parts by weight) | Second amount of silica dispersion (parts by weight) | Amount of third solvent (parts by weight) |
|---|---|---|---|---|---|---|
| Comparative Example 4 | Silica dispersion E (Y100SP-CD1, Admatechs) average particle size: 100 nm amount of silica particles present in dispersion: 20 wt % | 35.80 | 0.36 | 35.44 | 64.04 | 336.29 |
| Comparative Example 5 | Silica dispersion A (SSD_330T, Ranco) average particle size: 10 nm the amount of silica particles present in dispersion: 30 wt % | 92.0 | 0.11 | 10.93 | 64.29 | 300.53 |
| Comparative Example 6 | Silica dispersion A (SSD_330T, Ranco) average particle size: 10 nm amount of silica particles present in dispersion: 30 wt % | 92 | 3.04 | 300.56 | 61.36 | 300.53 |
| Comparative Example 7 | Silica dispersion A (SSD_330T, Ranco) average particle size: 10 nm amount of silica particles present in dispersion: 30 wt % | 8.93 | 0.27 | 26.53 | 64.13 | 358.68 |

Measurement Example

The following measurements were performed on the polyimide-based films produced in Examples 1 to 7 and Comparative Examples 1 to 7.

1) Measurement of Density Ratio (DR) of True Density to Density-Gradient Tube Density The true density and density-gradient tube density of the polyimide-based films were measured as follows, and the density ratio (DR) of true density to density-gradient tube density was calculated in accordance with the following Equation using the measured true density and density-gradient tube density.

$$DR = \text{True density/Density-gradient tube density} \quad \text{<Equation 1>}$$

(1) Measurement of True Density

Specifically, a specimen of the film 100 (10×10 cm$^2$) was finely cut into segments having a size of 1×1 cm$^2$ or less, and charged along with iron beads (pulverizer) in a sample holder. A cryogenic crusher (Japan Analytical Industry, JFC-300) was filled more than ⅔ full with liquid nitrogen, the sample holder containing the cut specimen was mounted on the cryogenic crusher, and then the chamber was closed. The specimen was pulverized using the cryogenic crusher for a running time of 15 minutes or more, after pre-cooling for 15 minutes. The true density of the pulverized specimen of the film 100 was measured seven times using an AccuPyc 1340 pycnometer produced by Micromeritics Co., Ltd. (using helium gas). The average of the remaining true density values after exclusion of the highest and lowest values from the measured true densities of the pulverized film 100 was taken as the true density of the film 100.

(2) Measurement of Density-Gradient Tube Density

The density-gradient tube density of the polyimide-based film 100 may be obtained in accordance with the ASTM D1505 standard using a density-gradient tube.

2) Measurement of Particle Volume Concentration (PVC)

The volume of the filler ($V_1$) and the volume of the matrix ($V_2$) of the polyimide-based film, and the particle volume concentration (PVC) of the polyimide-based film were calculated in accordance with the following Equation 2:

$$PVC\ (\%) = [V_1/(V_1+V_2)]*100 \quad \text{<Equation 2>}$$

wherein $V_1$ is the volume of the filler and $V_2$ is the volume of the matrix.

The volume ($V_1$) of the filler may be calculated by dividing the mass of the filler by the density thereof. Specifically, the volume ($V_1$) of the filler may be calculated by measuring each of the mass and density of the filler included in the film 100. For example, the mass of the filler may be determined by measuring the weight of the filler that is added when the film 100 is produced. The density of the filler may be measured using a method of measuring the true density or a method of measuring the density-gradient tube density.

The volume ($V_2$) of the matrix may be calculated by dividing the mass of the matrix by the density thereof. Specifically, the volume ($V_2$) of the matrix may be calculated by measuring each of the mass and density of the matrix included in the film 100. For example, the mass of the matrix may be determined by measuring the weight of the matrix that is added when the film 100 is produced. The density of the matrix may be measured using a method of measuring the true density or a method of measuring the density-gradient tube density.

3) Young's modulus and elongation: the Young's modulus and elongation of the polyimide-based film were measured using a universal tensile tester produced by Instron in accordance with the ASTM D885 standard.

4) Indentation hardness: the produced polyimide-based film was cut into segments having a size of 2 cm×10 cm and the HV value thereof was measured using an HM2000 Fischer scope (Helmut Fischer) (measurement conditions: F=12.000 mN/12 s, C=5.0 s). The HV value was measured a total of 7 times, and the average of the remaining HV values, after exclusion of the highest and lowest values from the 7 HV values, was calculated to obtain the indentation hardness of the polyimide-based film.

5) Light transmittance (%): the average light transmittance at a wavelength of 360 to 740 nm was measured using a spectrophotometer (CM-3700D, KONICA MINOLTA) in accordance with the ASTM E313 standard.

6) Yellowness (Yellow Index, Y.I.): the yellowness (Yellow Index, Y.I.) was measured using a spectrophotometer (CM-3700D, KONICA MINOLTA) in accordance with the ASTM E313 standard.

7) Haze: the produced polyimide-based film was cut into 50 mm×50 mm pieces and measured 5 times in accordance with the ASTM D1003 standard using a haze meter produced by Murakami Color Research Laboratory (model name: HM-150), and the average thereof was taken as the haze.

The measurement results are shown in Tables 2 and 3 below.

TABLE 2

| Item | True density | Density-gradient tube density | Density ratio (DR) of true density to density-gradient tube density | Particle volume concentration (PVC) (%) |
|---|---|---|---|---|
| Example 1 | 1.615 | 1.475 | 1.095 | 7.4 |
| Example 2 | 1.719 | 1.608 | 1.069 | 27.92 |
| Example 3 | 1.782 | 1.694 | 1.052 | 37.07 |
| Example 4 | 1.619 | 1.480 | 1.094 | 7.4 |
| Example 5 | 1.692 | 1.573 | 1.076 | 23.6 |
| Example 6 | 1.718 | 1.607 | 1.069 | 27.92 |
| Example 7 | 1.631 | 1.571 | 1.038 | 23.58 |
| Comparative Example 1 | 1.880 | 1.702 | 1.105 | 46.8 |
| Comparative Example 2 | 1.619 | 1.460 | 1.109 | 7.4 |
| Comparative Example 3 | 1.617 | 1.461 | 1.107 | 7.4 |
| Comparative Example 4 | 1.618 | 1.459 | 1.109 | 7.4 |
| Comparative Example 5 | 1.629 | 1.47 | 1.108 | 23.58 |
| Comparative Example 6 | 1.63 | 1.47 | 1.109 | 23.58 |
| Comparative Example 7 | 1.604 | 1.45 | 1.106 | 2.91 |

TABLE 3

| Item | Young's modulus (GPa) | Elongation (%) | Indentation hardness | Light transmittance (%) | Yellowness (Y.I.) | Haze |
|---|---|---|---|---|---|---|
| Example 1 | 5.1 | 28 | 46 | 89.6 | 2.7 | 0.2 |
| Example 2 | 5.7 | 25 | 51 | 90.4 | 2.3 | 0.2 |
| Example 3 | 5.8 | 20 | 53 | 90.6 | 2.1 | 0.3 |
| Example 4 | 5.1 | 17 | 46 | 89.7 | 2.8 | 0.3 |
| Example 5 | 5.5 | 16 | 49 | 90.1 | 2.5 | 0.3 |
| Example 6 | 5.7 | 24 | 52 | 90.5 | 2.2 | 0.2 |
| Example 7 | 5.6 | 17 | 50 | 90.4 | 2.2 | 0.3 |
| Comparative Example 1 | 4.9 | 7 | 41 | 88.8 | 3.1 | 0.6 |
| Comparative Example 2 | 4.9 | 10 | 41 | 88.5 | 3.2 | 0.8 |
| Comparative Example 3 | 4.9 | 13 | 40 | 88.3 | 3.5 | 1.2 |
| Comparative Example 4 | 4.7 | 11 | 41 | 88.2 | 3.9 | 1.8 |
| Comparative Example 5 | 4.8 | 14 | 42 | 88.7 | 3.2 | 0.8 |
| Comparative Example 6 | 4.9 | 13 | 41 | 88.7 | 3.1 | 0.8 |
| Comparative Example 7 | 4.7 | 14 | 43 | 88.6 | 3.4 | 0.7 |

As can be seen from the results of measurement shown in Tables 2 and 3, the polyimide-based film 100 according to the embodiments of the present disclosure had a density ratio (DR) of true density to density-gradient tube density of 1.10 or less, and thus exhibited excellent mechanical properties such as Young's modulus, elongation, and indentation hardness, as well as superior optical properties, such as excellent light transmittance, low yellowness (Yellow Index, Y.I.), and low haze.

However, the polyimide-based film 100 according to Comparative Example 1, in which the amount of the filler was higher than 50% by weight based on the total weight of the polyimide-based film, had a density ratio (DR) of true density to density-gradient tube density of more than 1.10, a particle volume concentration (PVC) of more than 38%, a Young's modulus of less than 5.0 GPa, an elongation of less than 15%, an indentation hardness of less than 45%, and a yellowness (Yellow Index, Y.I.) of more than 3.0.

The polyimide-based film 100 according to Comparative Example 2, in which the polyimide-based resin powder was mixed with the filler dispersion in the state in which the polyimide-based resin powder was not separated into the first amount and the second amount, had a density ratio (DR) of true density to density-gradient tube density of more than 1.10, a Young's modulus of less than 5.0 GPa, an elongation of less than 15%, an indentation hardness of less than 45%, and a yellowness (Yellow Index, Y.I.) of more than 3.0.

The polyimide-based film 100 according to Comparative Example 3, in which the polyimide-based resin powder was mixed with the filler dispersion in the state in which the polyimide-based resin powder was not separated into the first amount and the second amount and the average particle diameter of the filler was higher than 50 nm, had a density ratio (DR) of true density to density-gradient tube density of more than 1.10, a Young's modulus of less than 5.0 GPa, an elongation of less than 15%, an indentation hardness of less than 45%, a yellowness (Yellow Index, Y.I.) of more than 3.0, and a haze of more than 1%.

The polyimide-based film 100 according to Comparative Example 4, in which the average particle size of the filler was higher than 50 nm, had a density ratio (DR) of true density to density-gradient tube density of more than 1.10, a Young's modulus of less than 5.0 GPa, an elongation of less than 15%, an indentation hardness of less than 45%, a yellowness (Yellow Index, Y.I.) of more than 3.0, and a haze of more than 1%.

The polyimide-based film 100 according to Comparative Example 5, in which the first amount of the polyimide-based resin powder based on the weight of the filler was less than 0.5%, had a density ratio (DR) of true density to density-gradient tube density, of more than 1.10, a Young's modulus of less than 5.0 GPa, an elongation of less than 15%, an indentation hardness of less than 45%, and a yellowness (Yellow Index, Y.I.) of more than 3.0.

The polyimide-based film 100 according to Comparative Example 6, in which the first amount of the polyimide-based resin powder based on the weight of the filler was higher than 10%, had a density ratio (DR) of true density to density-gradient tube density, of more than 1.10, a Young's modulus of less than 5.0 GPa, an elongation of less than 15%, an indentation hardness of less than 45%, and a yellowness (Yellow Index, Y.I.) of more than 3.0.

The polyimide-based film 100 according to Comparative Example 7, in which the amount of the filler was less than 5% by weight based on the total weight of the polyimide-based film, had a density ratio (DR) of true density to density-gradient tube density of more than 1.10, a Young's modulus of less than 5.0 GPa, an elongation of less than 15%, an indentation hardness of less than 45%, and a yellowness (Yellow Index, Y.I.) of more than 3.0.

EXPLANATION OF REFERENCE NUMERALS

100: Polyimide-based film
110: Polyimide-based matrix
120: Filler
200: Display device
501: Display panel

The invention claimed is:

1. A polyimide-based film comprising:
   a polyimide-based matrix; and
   a filler dispersed in the polyimide-based matrix,
   wherein the polyimide-based matrix has an imide repeating unit and an amide repeating unit,
   wherein the filler comprises silica ($SiO_2$),
   wherein at least a part of the silica ($SiO_2$) is surface-treated with at least one of methylalkoxysilane, ethylalkoxysilane, or phenylalkoxysilane,
   wherein the polyimide-based film has a density ratio (DR) of a true density to a density-gradient tube density of 1.10 or less,
   wherein the density ratio is calculated in accordance with the following Equation 1:

Density Ratio(DR)=true density/density-gradient tube density     <Equation 1>.

2. The polyimide-based film according to claim 1, wherein the polyimide-based film has a particle volume concentration (PVC) of 5 to 38%,
   wherein the particle volume concentration (PVC) is calculated in accordance with the following Equation 2:

PVC (%)=[$V_1/(V_1+V_2)$]*100     <Equation 2> wherein $V_1$ is the volume of the filler and $V_2$ is the volume of the matrix.

3. The polyimide-based film according to claim 1, wherein the filler has an average particle size of 5 to 50 nm.

4. The polyimide-based film according to claim 1, wherein the filler is present in an amount of 5 to 50% by weight based on a total weight of the polyimide-based film.

5. The polyimide-based film according to claim 1, wherein the polyimide-based film has a Young's modulus of 5.0 GPa or more.

6. The polyimide-based film according to claim 1, wherein the polyimide-based film has an elongation of 15% or more.

7. The polyimide-based film according to claim 1, wherein the polyimide-based film has an indentation hardness of 45 or more.

8. The polyimide-based film according to claim 1, wherein the polyimide-based film has a yellowness (Yellow Index, Y.I.) of 3 or less.

9. The polyimide-based film according to claim 1, wherein the polyimide-based film has a haze of 1% or less.

10. The polyimide-based film according to claim 1, wherein the polyimide-based film has a light transmittance of 85% or more.

11. A display device comprising:
    a display panel; and
    the polyimide-based film according to claim 1 disposed on the display panel.

* * * * *